United States Patent [19]

Marusak

[11] Patent Number: 5,592,604
[45] Date of Patent: Jan. 7, 1997

[54] METHOD AND SYSTEM FOR INDICATING BOUNDARIES OF CONNECTED DATA SUBSETS

[75] Inventor: Scott M. Marusak, Cary, N.C.

[73] Assignee: International Business Machines Corporation, Armonk, N.Y.

[21] Appl. No.: 298,704

[22] Filed: Aug. 31, 1994

[51] Int. Cl.$^6$ .................................................. G06F 3/14
[52] U.S. Cl. .......................................... 395/340; 395/352
[58] Field of Search .................................... 395/155, 156, 395/157, 158, 159, 160, 161, 164

[56] References Cited

U.S. PATENT DOCUMENTS

| | | | |
|---|---|---|---|
| 4,868,785 | 9/1989 | Jordan et al. | 364/900 |
| 4,896,291 | 1/1990 | Gest et al. | 364/900 |
| 5,016,170 | 5/1991 | Pollalis et al. | 364/401 |
| 5,179,652 | 1/1993 | Rozmanith et al. | 395/155 |
| 5,185,857 | 2/1993 | Rozmanith et al. | 395/148 |
| 5,204,947 | 4/1993 | Bernstein et al. | 395/157 |
| 5,233,687 | 8/1993 | Henderson, Jr. et al. | 395/158 |
| 5,339,392 | 8/1994 | Risberg et al. | 395/161 |
| 5,394,521 | 2/1995 | Henderson, Jr. et al. | 395/158 |
| 5,414,809 | 5/1995 | Hogan et al. | 395/155 |

*Primary Examiner*—Mark R. Powell
*Assistant Examiner*—Ruay Lian Ho
*Attorney, Agent, or Firm*—Gregory M. Doudnikoff

[57] ABSTRACT

A method and system for indicating boundaries of data subsets that are displayed in a display window in a data processing system. Data having data subsets are displayed within a display window with a selected data subset being visible within the window. The selected data subset has an upper and lower boundary. A marker is displayed in association with the display window in response to a selected data subset within the plurality of data subsets being displayed within the display window. The marker has two terminuses, an upper terminus and a lower terminus. The location of the upper terminus indicates an upper boundary of the selected data subset and the location of the lower terminus indicates the lower boundary of the selected data subset. An absence of one of the two terminuses intuitively indicates, to a user, a presence of additional undisplayed data within the selected data set that is not displayed within the display window. An absence of the upper terminus indicates that the upper boundary of the selected data subset is not visible, and an absence of the lower terminus indicates that the lower boundary of the selected data subset is not visible. The slope of the sides of the marker provide an indication of how far away the absent terminus is from the visible portion of the marker.

18 Claims, 15 Drawing Sheets

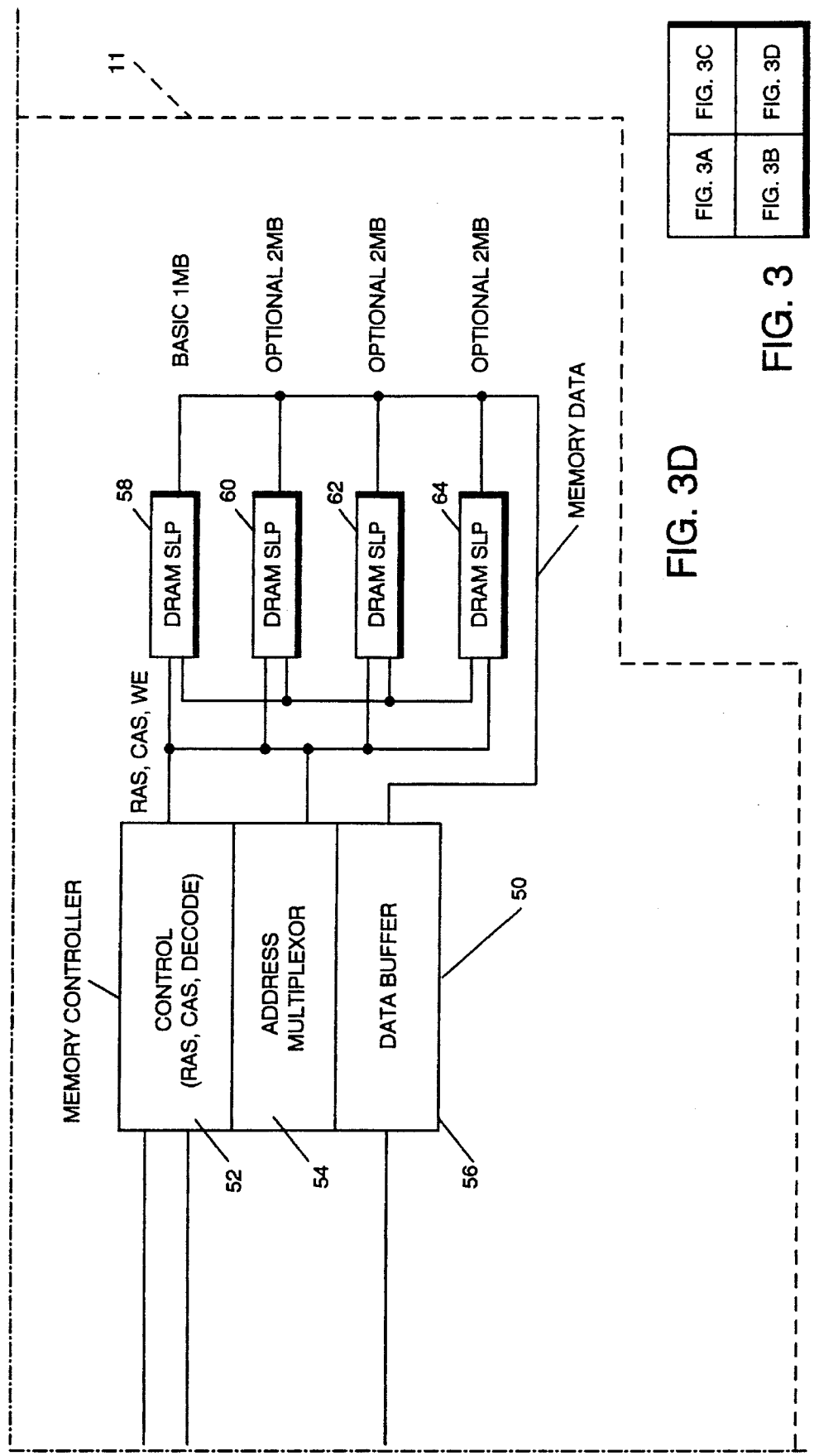

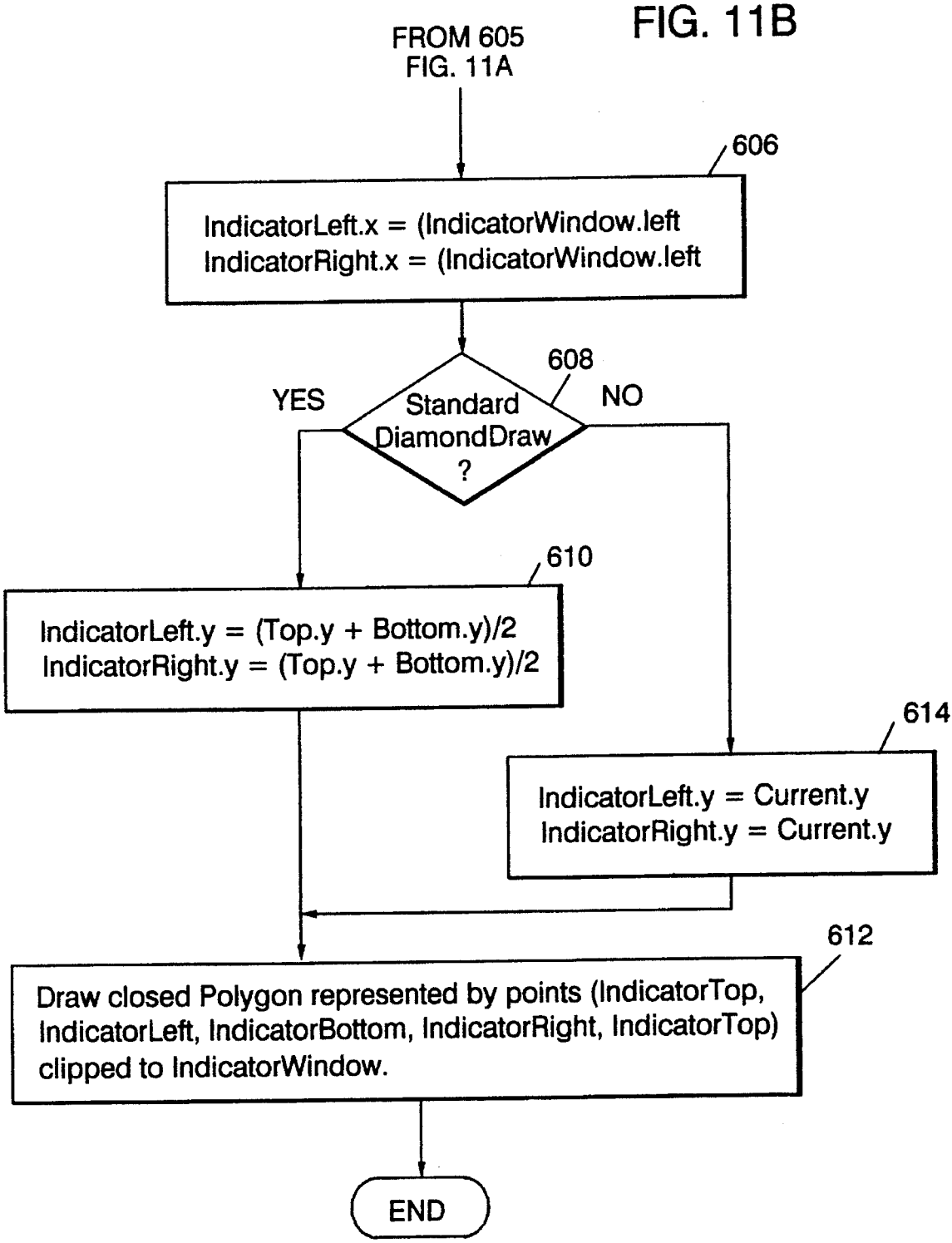

METHOD AND SYSTEM FOR INDICATING BOUNDARIES OF CONNECTED DATA SUBSETS

BACKGROUND OF THE INVENTION

1. Technical Field

The present invention relates in general to improved data processing systems and in particular to improvements in the presentation of data within a data processing system. Still more particularly, the present invention relates to improvements in the display of data within a display window in a data processing system.

2. Description of the Related Art

The manipulation of data in a data processing system is well known in the prior art. Data may be manipulated in many ways in a modern state-of-the-art data processing system including: data accessing; data encoding data communications; data compression; data conversion; data entry; data exchange; data linking; data locking; data mapping; data modeling; data processing; data recording; data sorting; and data transferring. The large amounts of data which are available to the user of a modern state-of-the-art data processing system often become overwhelming in magnitude and complexity.

As a result of the increasing complexity of data processing systems, attempts have been made to simplify the interface between a user and the large amounts of data present within a modern data processing system. One example of an attempt to simplify the interface between a user in a data processing system is the utilization of a so-called graphical user interface (GUI) to provide an intuitive and graphical interface between the user and the data processing system. The common user access (CUA) user interface is an example of one such GUI. Common user access is a trademark of the International Business Machines Corporation. The CUA user interface is often employed to organize and present large amounts of data to a user in a graphical and intuitive manner. More information on CUA interfaces may be found in systems application architecture common user access guide to user interface design, SC34-4289-00 available from International Business Machines Corporation.

A window, such as window 2 in FIG. 1 is employed to display lists or collections of data, such as items X to X+9 in subsets A to D. Frequently, indication of a subset of these data collections to the user is a requirement because of some significant distinguishing characteristic of the given subset's members. Standard and state-of-the-art methods for indicating subsets already exists, but these methods have a common failing. In particular, when the subset cannot be completely displayed on the display device, existing methods provide no indication to the user about the extent of the subset. Under the existing methods, the user must page up and down using a scroll bar 4 to determine the size of the subset. Also, if the application supports a cursor within the collection or list, current methods also fail to provide feedback as to the user's current relative location within the subset. Therefore, it would be advantageous to have an improved method and system for graphically indicating subsets to a user that can provide a user an indication of the extent of the subset.

SUMMARY OF THE INVENTION

It is one object of the present invention to provide an improved data processing system.

It is another object of the present invention to provide improvements in the presentation of data within a data processing system.

It is yet another object of the present invention to provide improvements in the display of data within a display window in a data processing system.

The present invention provides a method and system for indicating boundaries of data subsets that are displayed in a display window in a data processing system. Data having data subsets are displayed within a display window with a selected data subset being visible within the window. The selected data subset has an upper and lower boundary. A marker is displayed in association with the display window in response to a selected data subset within the plurality of data subsets being displayed within the display window. The marker has two terminuses, an upper terminus and a lower terminus. The location of the upper terminus indicates an upper boundary of the selected data subset and the location of the lower terminus indicates the lower boundary of the selected data subset. An absence of one of the two terminuses intuitively indicates, to a user, a presence of additional undisplayed data within the selected data set that is not displayed within the display window. An absence of the upper terminus indicates that the upper boundary of the selected data subset is not visible, and an absence of the lower terminus indicates that the lower boundary of the selected data subset is not visible. The slope of the sides of the marker provide an indication of how far away the absent terminus is from the visible portion of the marker.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
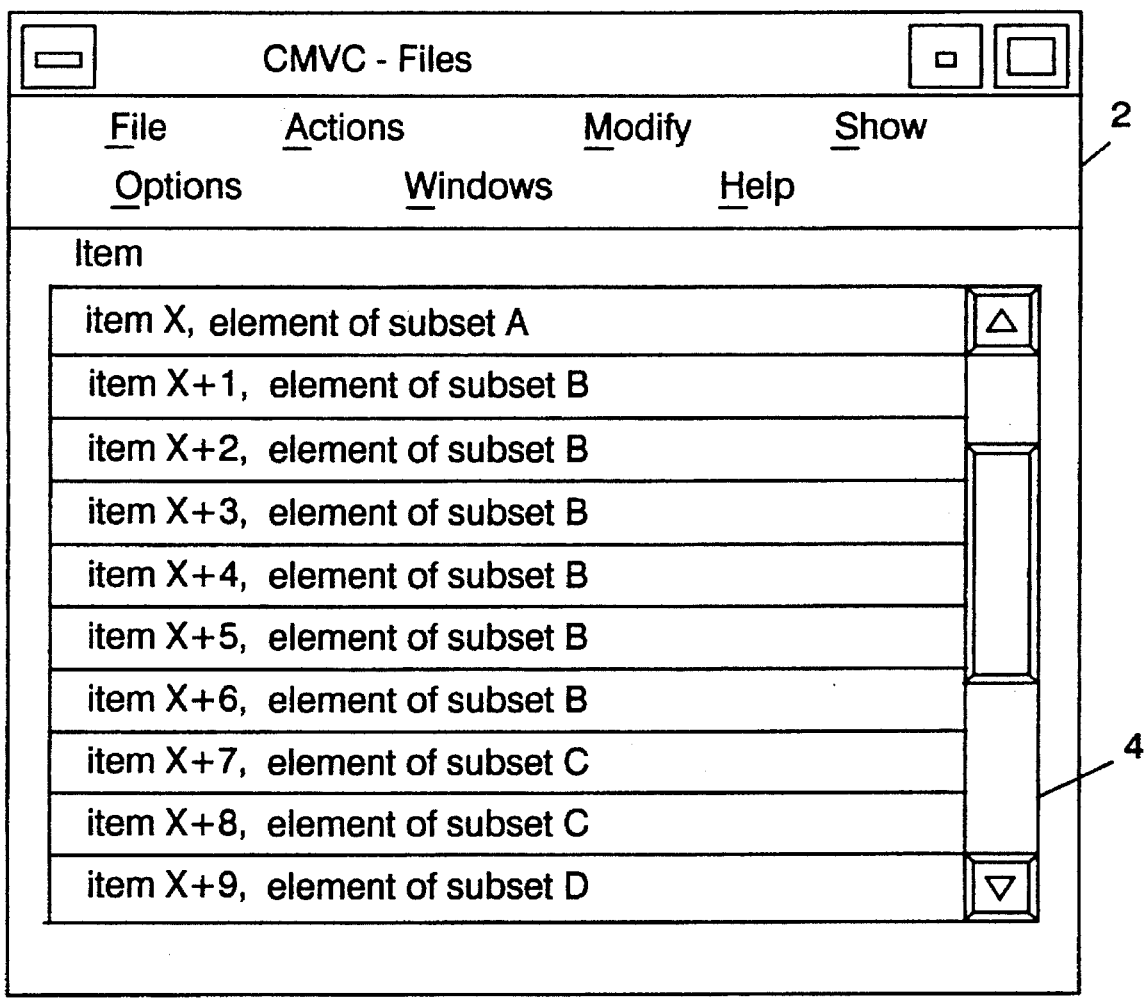
FIG. 1 depicts an illustration of a display window know in the prior art.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
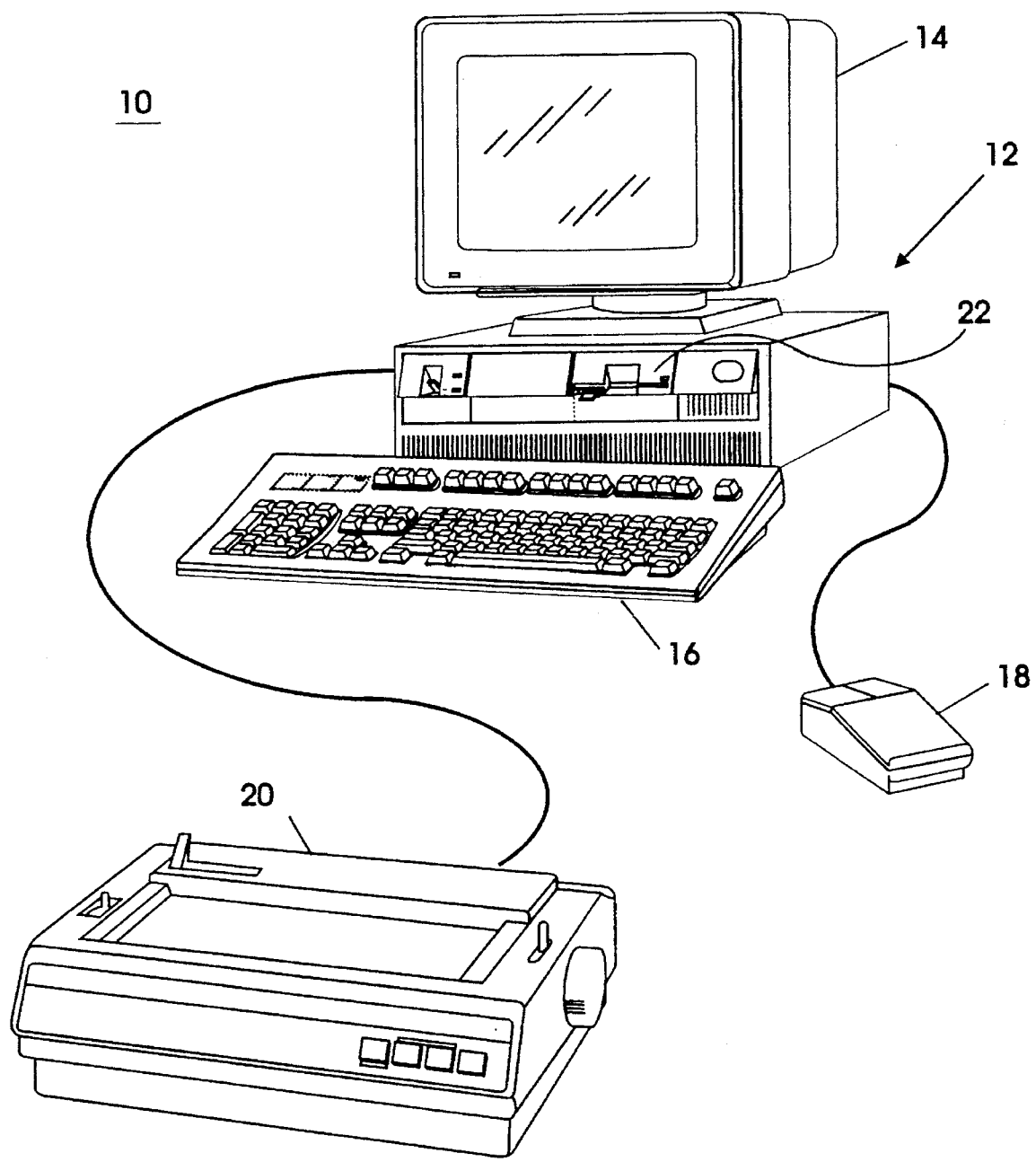
FIG. 2 is a data processing system in the form of a personal computer in accordance with the present invention.
Figure 3A:
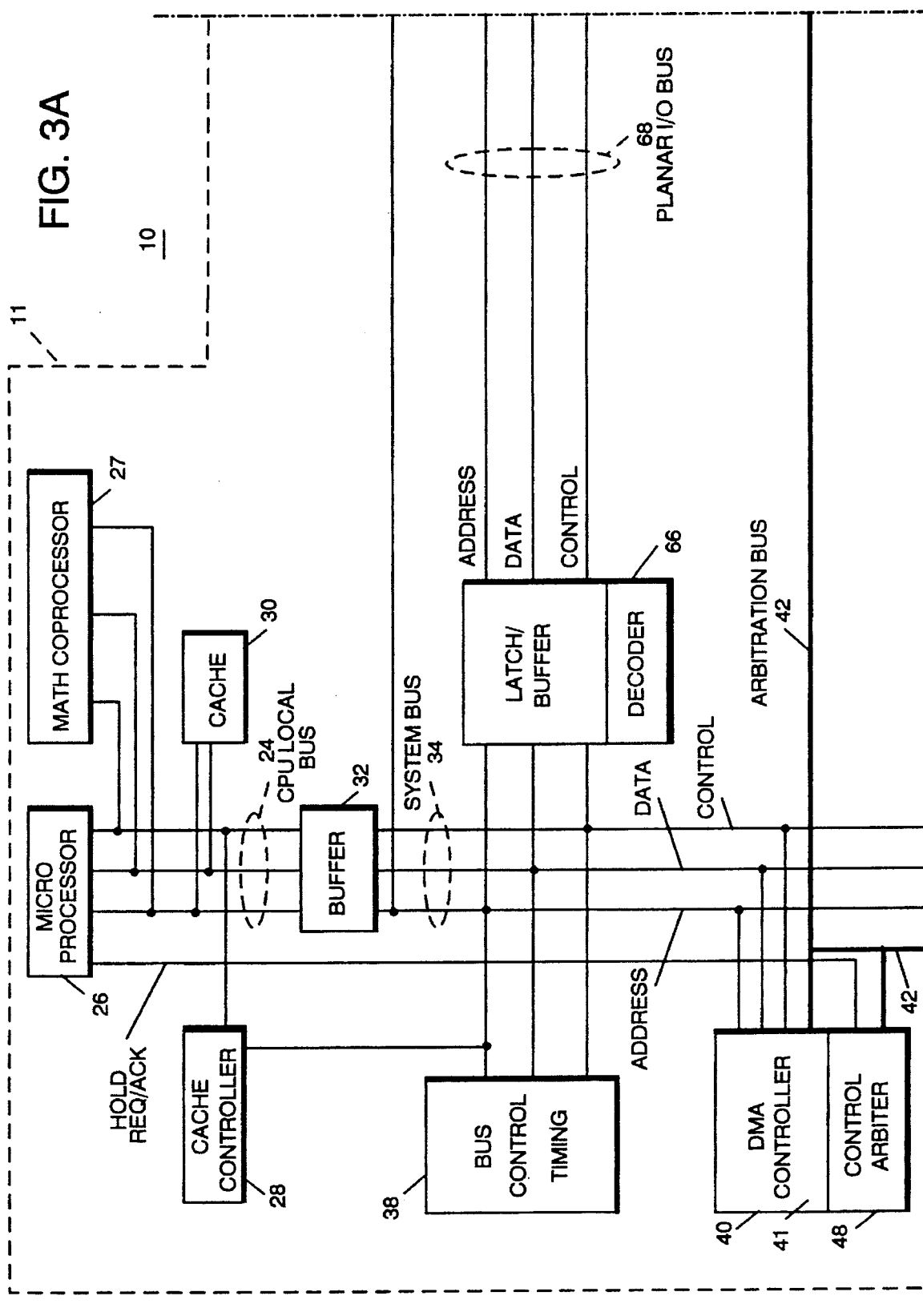
FIG. 3 depicts a block diagram of a personal computer system illustrating the various components of personal computer system in accordance with the present invention.
Figure 3B:
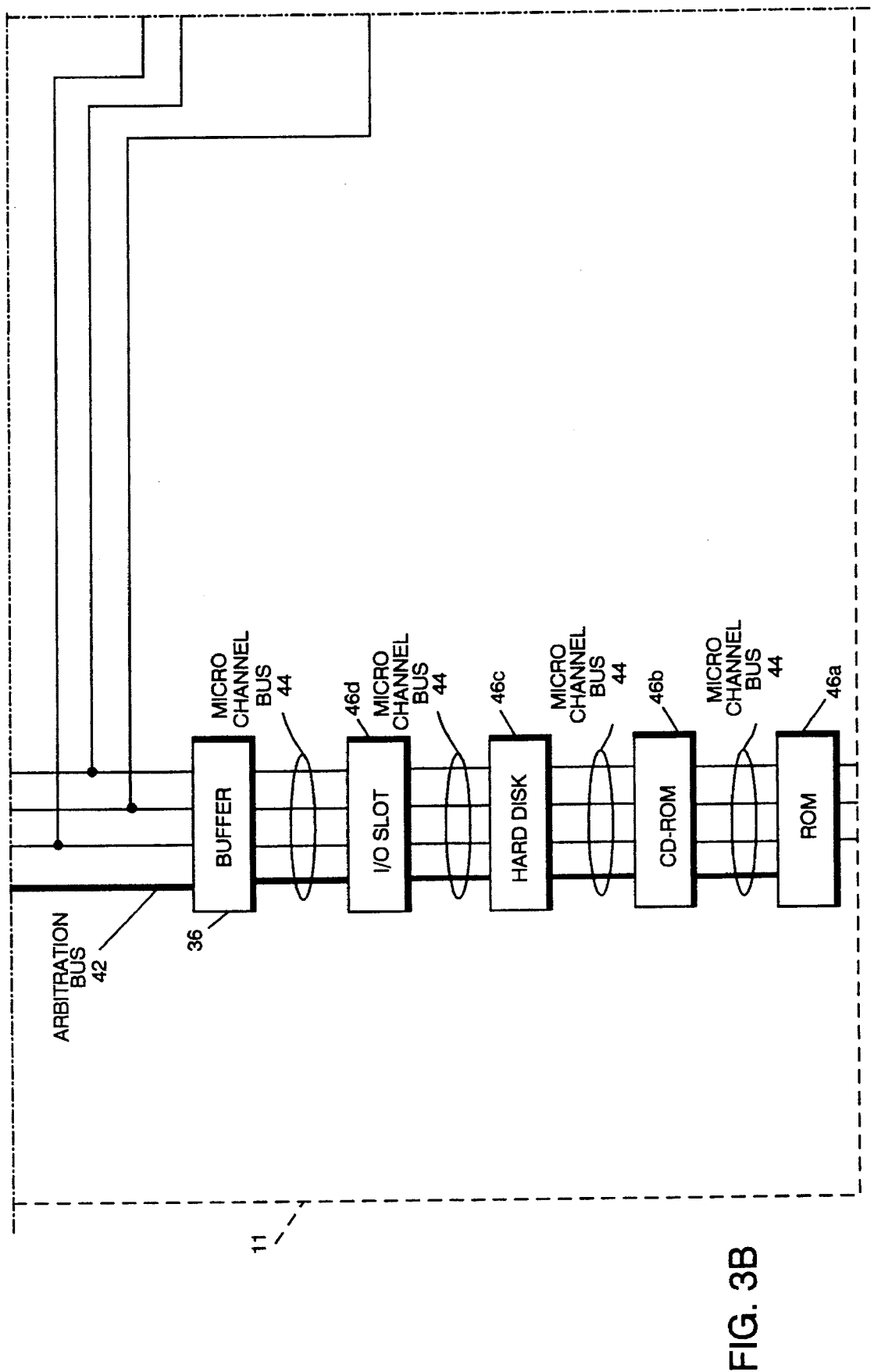
Figure 3C:
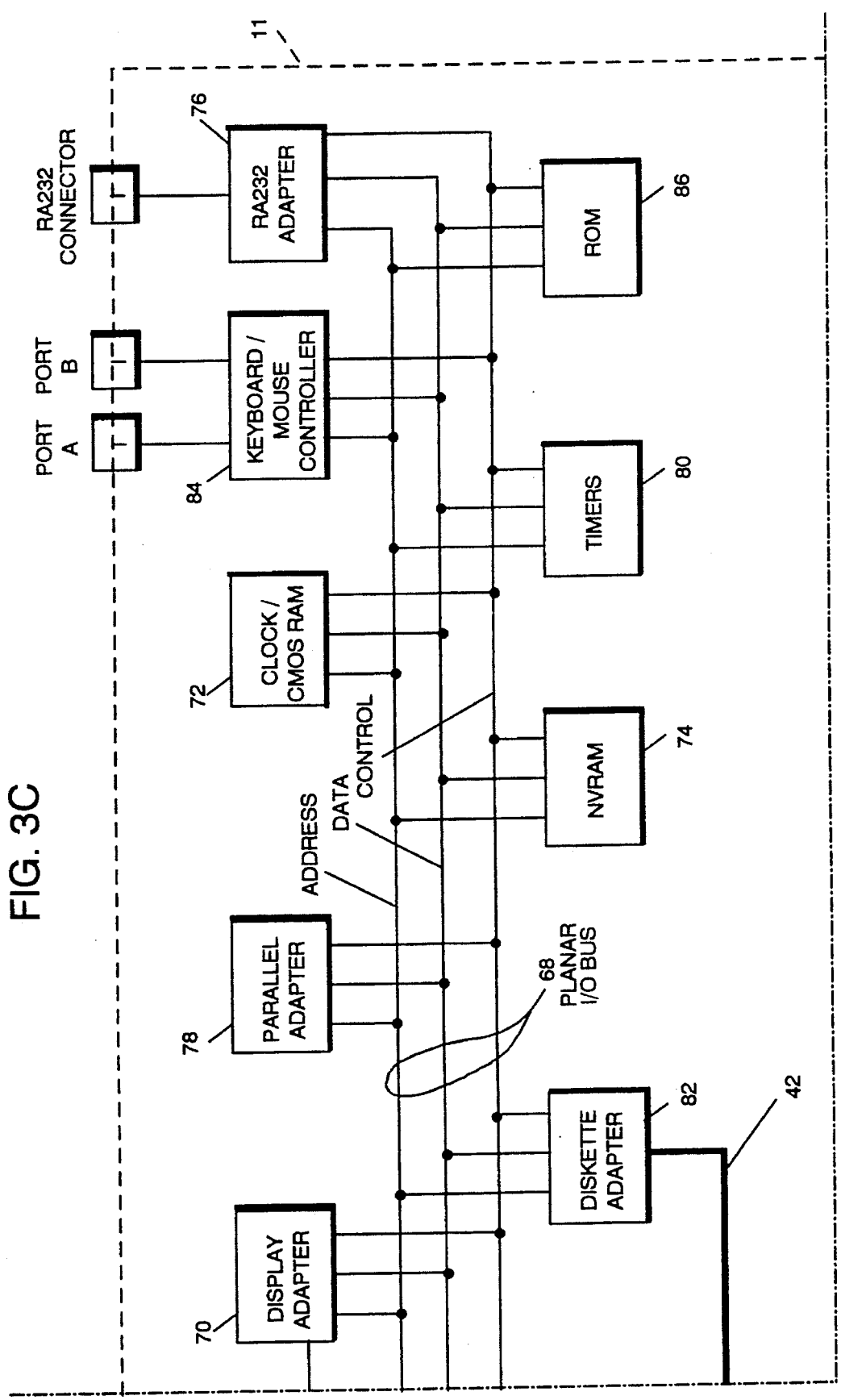

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. Other devices, such as a modem may be connected to an I/O slot. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the perdonal computer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

The present invention provides a method and system for indicating a subset in lists or collections of data. The present invention employs a graphical construct to overcome the shortcomings of displaying subsets of data in a window such as the one depicted in FIG. 1. In accordance with a preferred embodiment, the present invention employs a diamond or two triangles to indicate the extent of a subset. In particular, a diamond shaped polygon is drawn with an apex, a top point, corresponding to the first element of the subset and a nadir, a bottom point, corresponding to the end of the last element of the subset. The diamond is thickest at the center between the apex and the nadir and the diamond may be drawn without any concern for the "current" location or even the existence of a user's cursor within the subset in accordance with a preferred embodiment of the present invention. Such a diamond is symmetrical about two axes.

Alternatively, a diamond graphic indicator, symmetrical about one axis, also called a "deformed" diamond, may be employed in conjunction with the "current" location of the user within the subset or list. In this embodiment, the vertical location of the points are employed to indicate the vertical location of the center of the "current" subset member in accordance with a preferred embodiment of the present invention. The top point of the indicator is used to indicate the vertical position of the beginning of the first element of the subset and the bottom point of the indicator is employed to indicate the end of the last member of the subset. In this embodiment, the graphic indicator is updated whenever the "current" member is changed. Alternatively, the deformed diamond indicator may be displayed as two triangles having a common side with one point of one triangle indicating the top extent of the subset and another point of the other triangle indicating the bottom extent of the subset. The points at the common side would indicate the current member of the subset.

Figure 4:
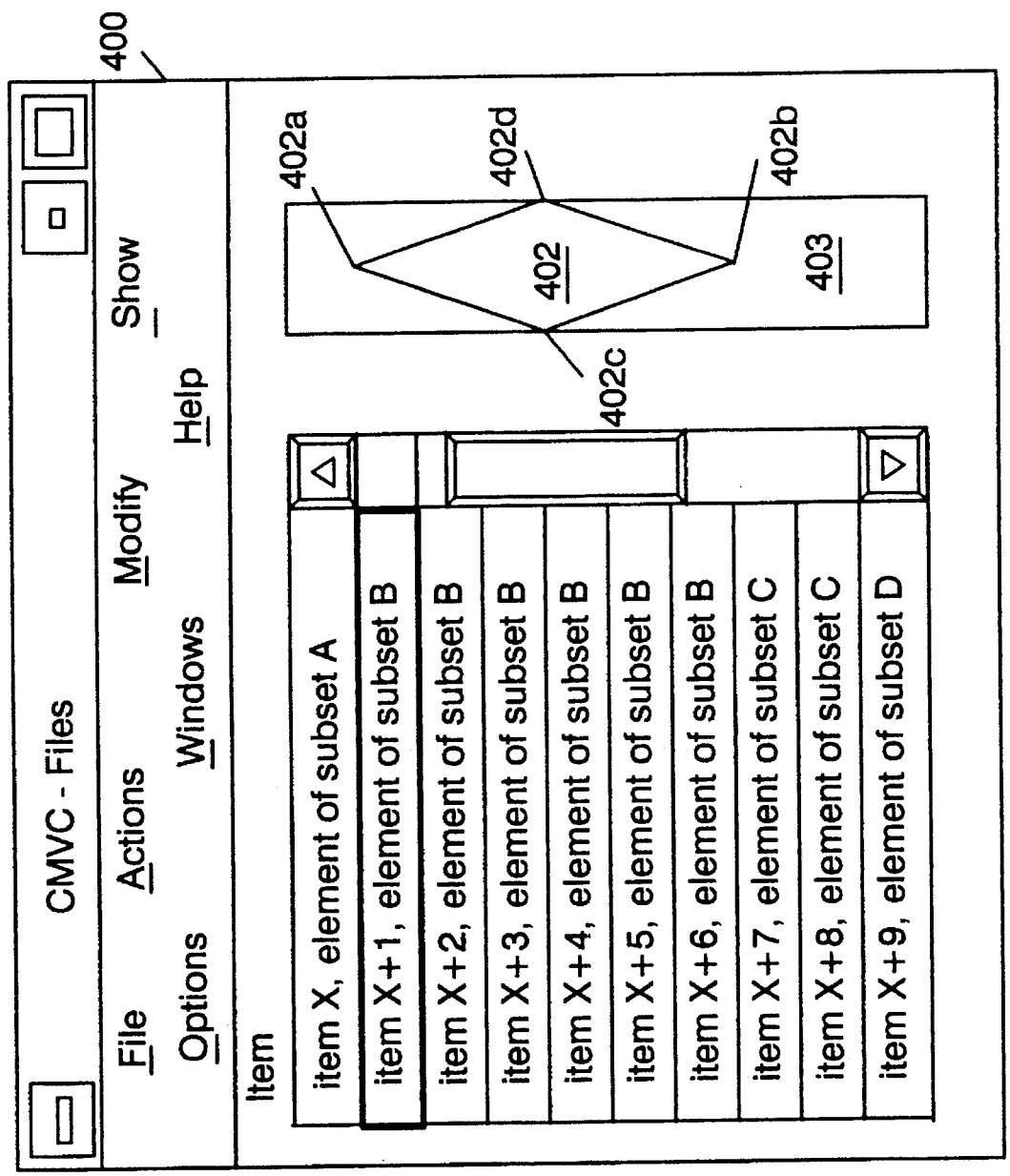
FIGS. 4–8 are illustrations of windows associated with a marker in accordance with a preferred embodiment of the present invention.

Referring now to FIG. 4, a window 400 is depicted including nine items X to X+9 in subsets A to D. Each subset is a "connected" subset in which all of the elements within a subset are contiguous. Marker 402, a diamond shaped marker, is displayed in association with window 400 in rectangle 503. As can be seen, point 402a indicates the upper extent of subset B, and point 402b indicates the lower extent of subset B. Point 402c and 402d indicate the center of subset B. Alternatively, marker 404 may be displayed in association with window 400. Marker 404 is displayed as a deformed diamond shape, a diamond that is symmetrical only along a single axis or line. Point 404a indicates the upper extent of subset B, item X+1, while point 404b indicates the lower extent of subset B, item X+6, in window 400. Item X+1 is the location currently selected by the user in FIG. 4. Points 404c and 404d indicate the center of item X+1, which is the location of the item currently selected by the user.

Figure 5:
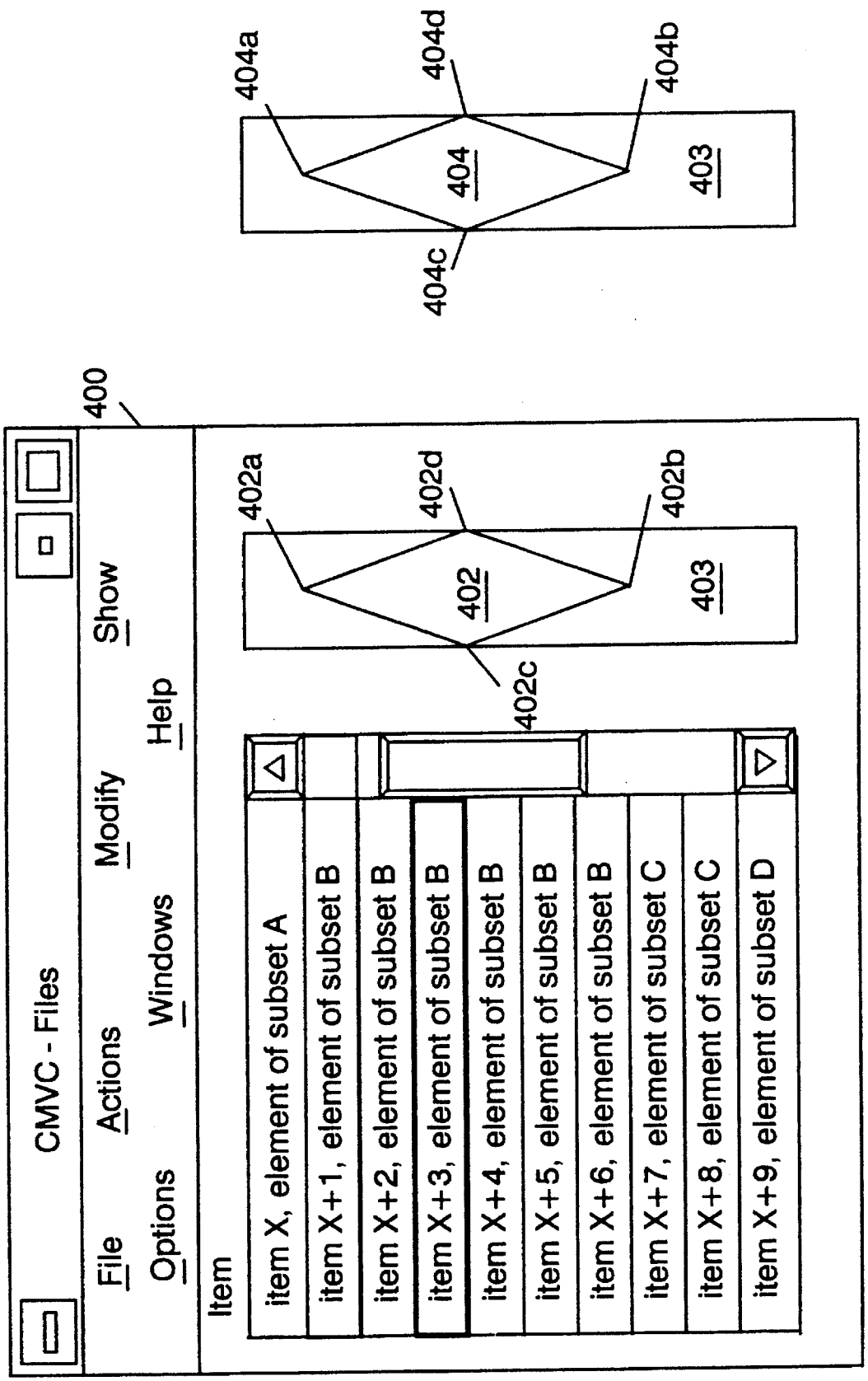

With reference to FIG. 5, item X+3 is the current item in subset B that has been selected by the user. Marker 402 is unchanged, while marker 404 has been altered such that points 404c and 404d indicate the center of item X+3, the item currently selected by the user.

Figure 6:
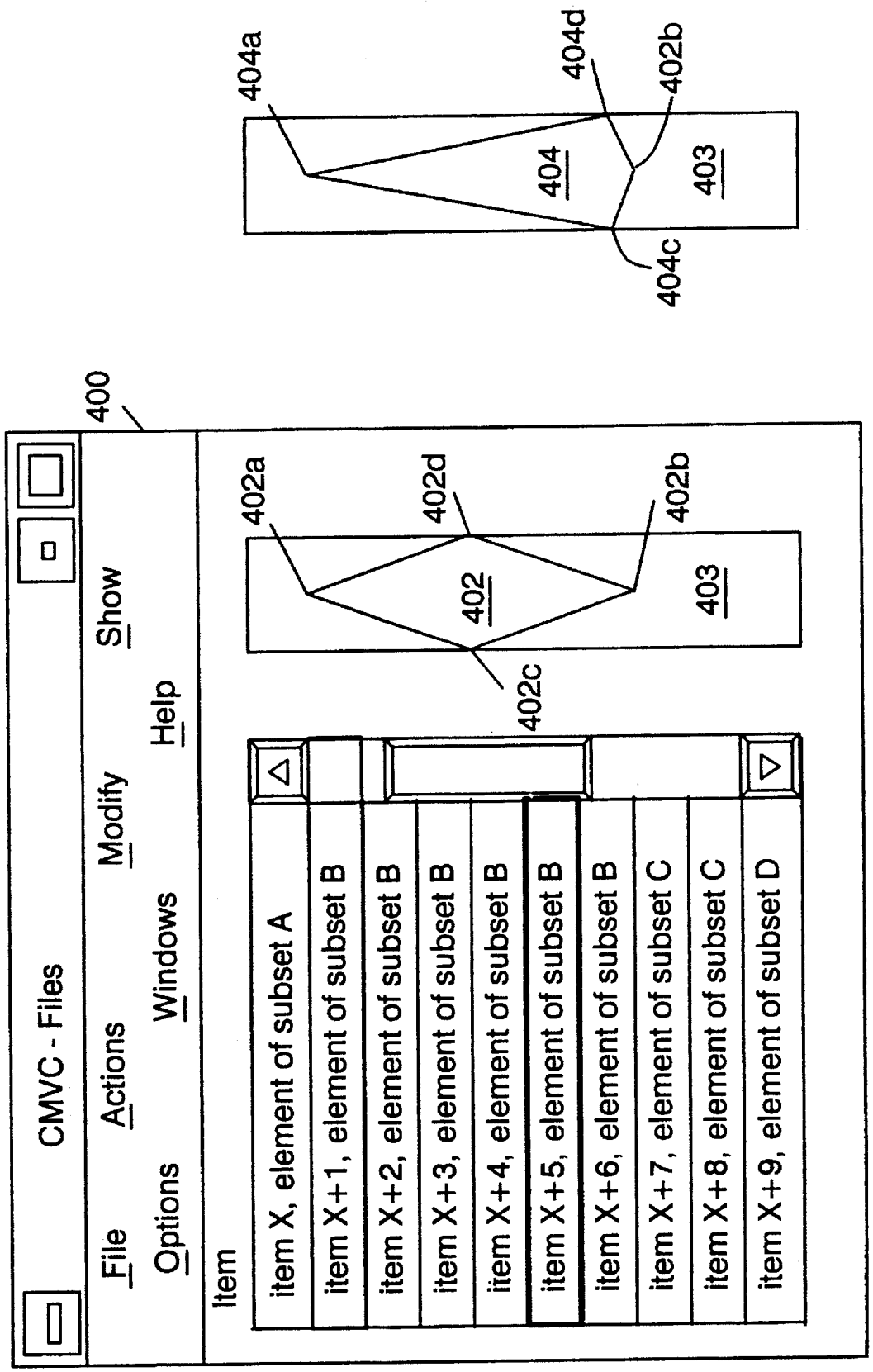
Figure 7:
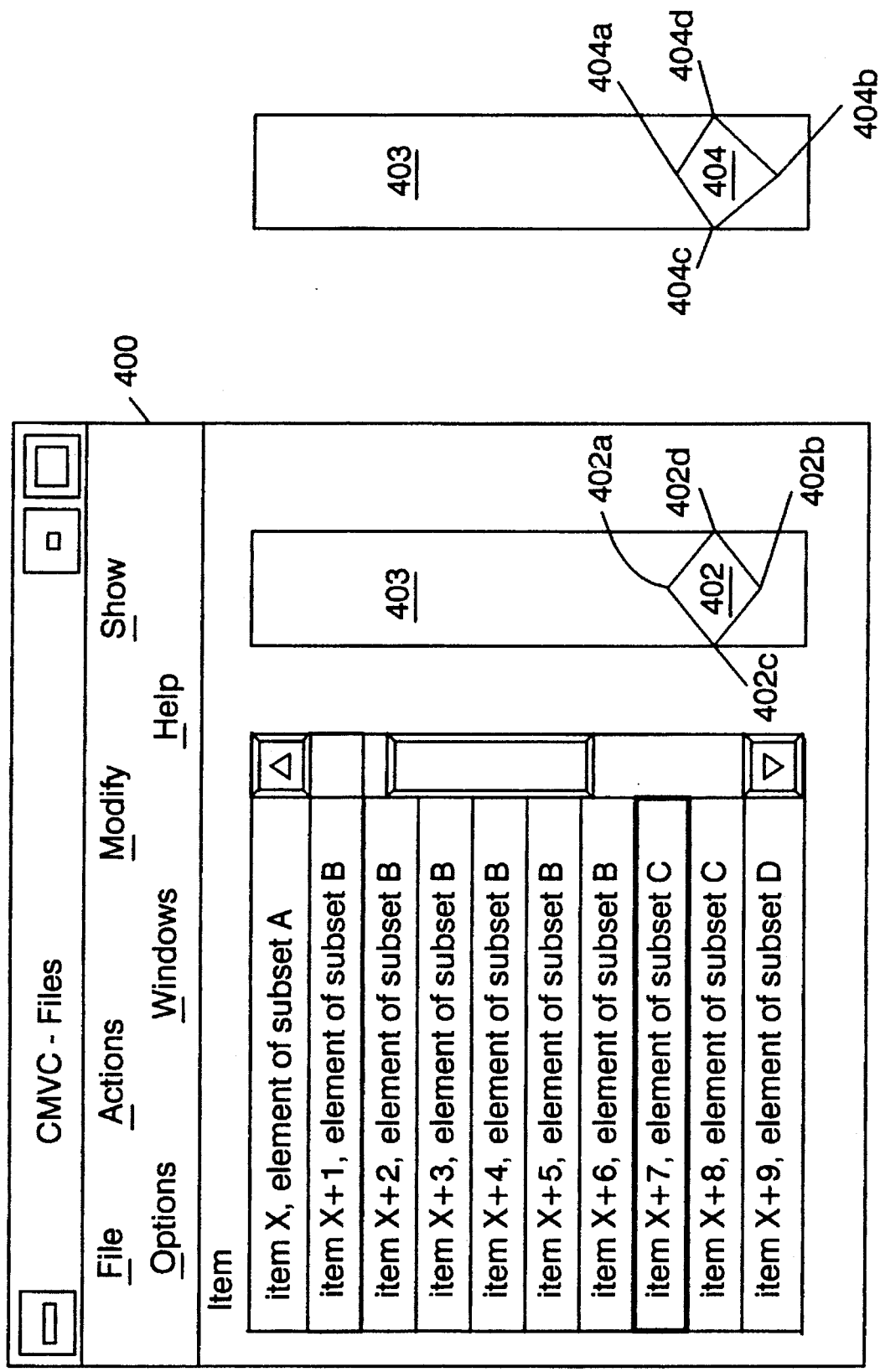

Referring now to FIG. 6, item X+5 of subset B is the current item in window 400. Again, marker 402 is unchanged, but marker 404 has been altered such that points 404c and 404d indicate that item X+5 is the current item in subset B. In FIG. 7, markers 402 and 404 indicate the extent of subset C, which includes items X+7 and X+8. Point 402a indicates the top of subset C, item X+7, while point 402b indicates the bottom of subset C, item X+8. Similarly, point 404a indicates the top of subset C while point 404b indicates the bottom of subset C. Points 402c and 402d graphically indicate the middle of subset C while points 404c and 404d indicate the item X+7 is the current item in subset C.

Figure 8:
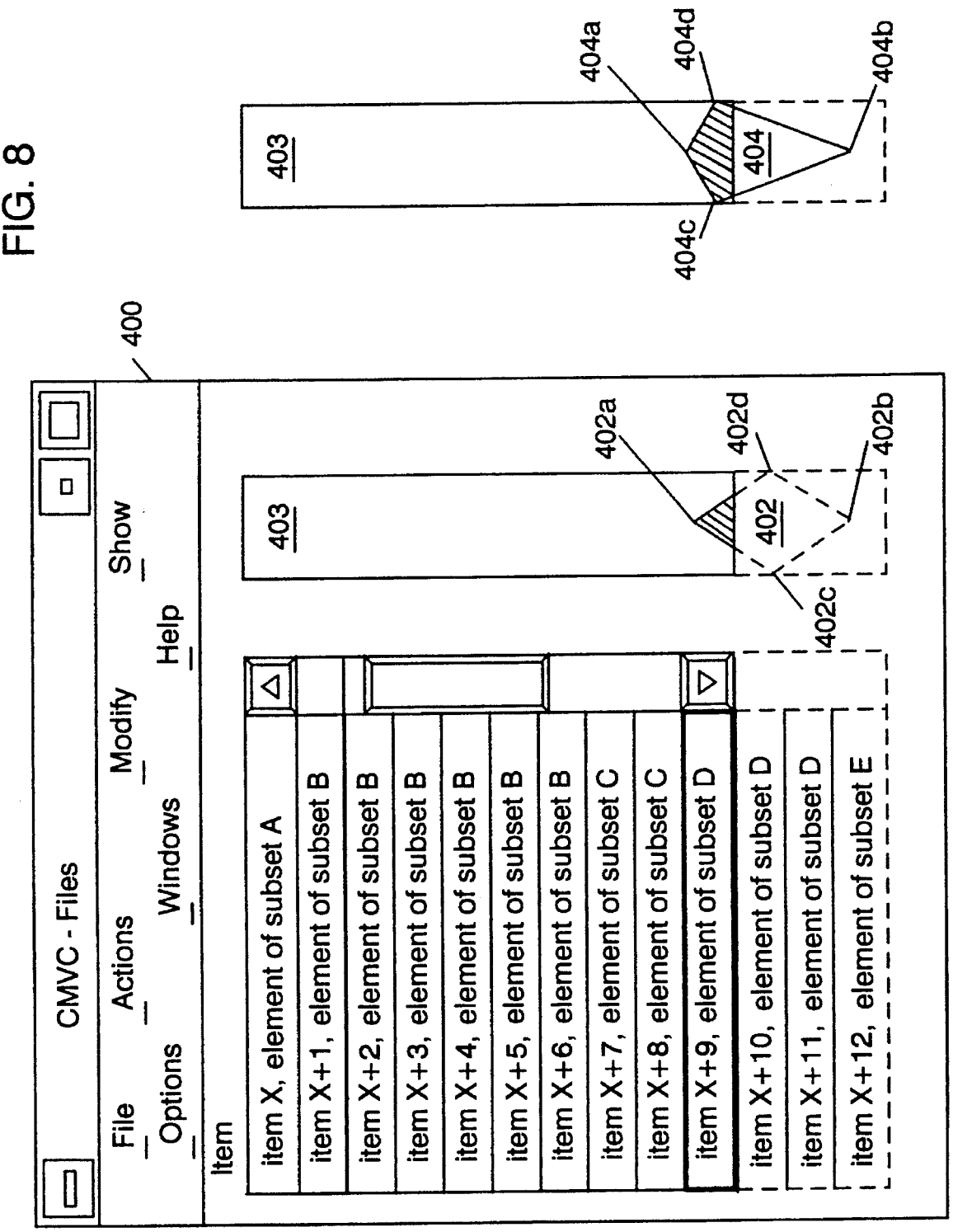

With reference now to FIG. 8, subset D is the subset indicated by markers 402 and 404. As can be seen, a portion of subset D is not visible within window 400. Specifically, only item X+9 is visible within subset D. Items X+10 and X+11 are not displayed within window 400. Point 402a in marker 402 points to the top extent of subset D, item X+9. Point 402b is not visible because the bottom extent of subset D, X+11, is not visible. Similarly, points 402c and 402d are not visible within window 400. Turning to marker 404, point 404a points to the top portion of subset D. Point 404b is not visible and points 404c and 404d indicate that item X+9 is the current item in subset D. By the portions of markers 402 and 404 displayed to the user, an indication of the size of subset D.

Figure 9:
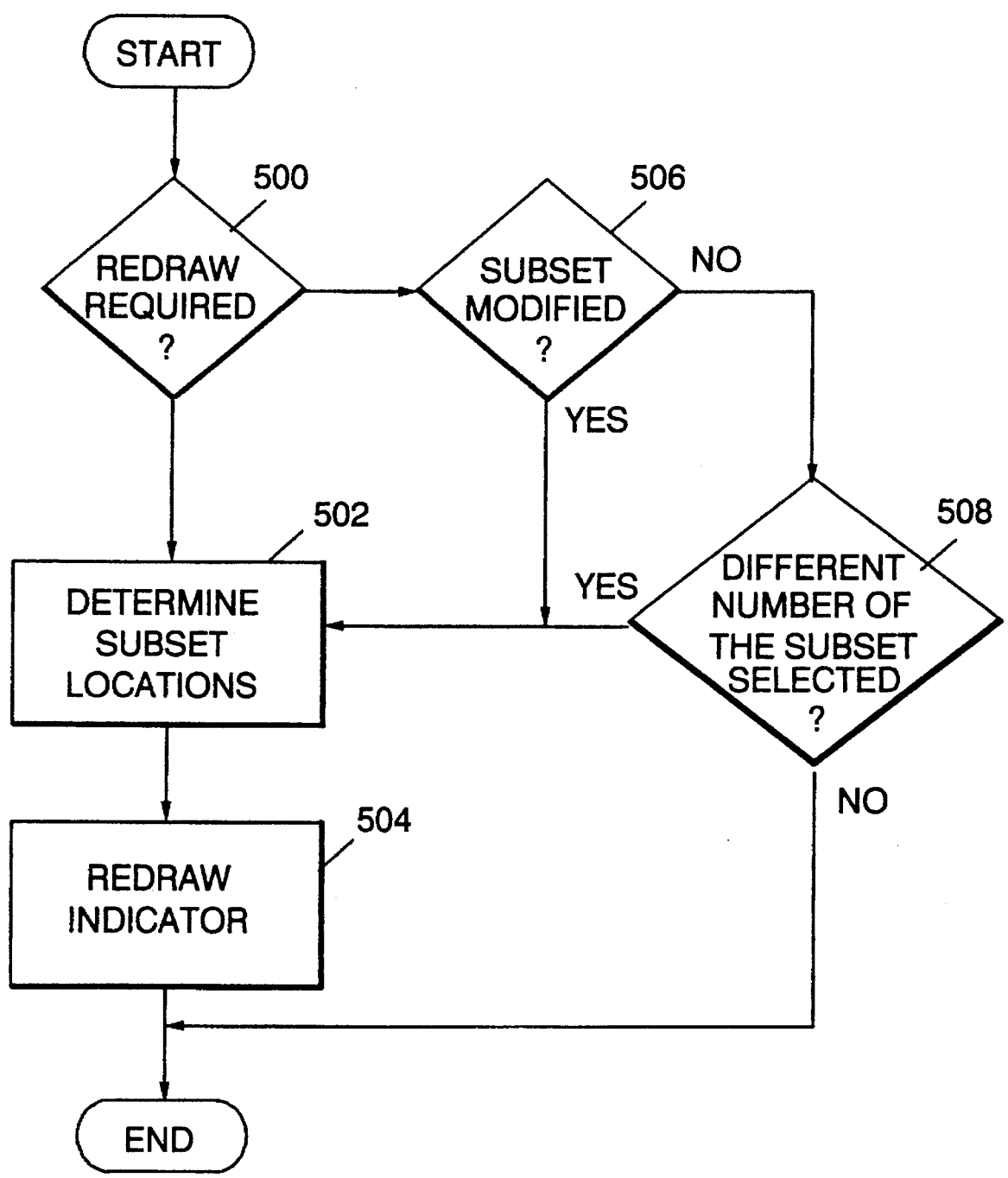
FIG. 9 depicts a high level flow chart of a process for indicating connective subsets displayed within a window in accordance with a preferred embodiment of the present invention.

Referring now to FIG. 9, a high level flow chart of a process for indicating subsets displayed within a window is illustrated in accordance with a preferred embodiment of the present invention. The process begins by determining whether a redraw is required (step 500). If a redraw is required, the process then determines subset locations (step 502). the indicator is then redrawn after subset locations are determined (step 504). Referring again to step 500, if a redraw is not required, the process then determines whether a subset has been modified (step 506). If the subset is modified, the subset locations are determined (step 502), and the indicator is redrawn (step 504). If the subset has not been modified, the process then determines whether a different number of the subset has been selected (step 508). If a different number of the subset has been selected, the subset locations are determined (step 502) and the indicator is redrawn (step 504). Otherwise, the process terminates.

Figure 10:
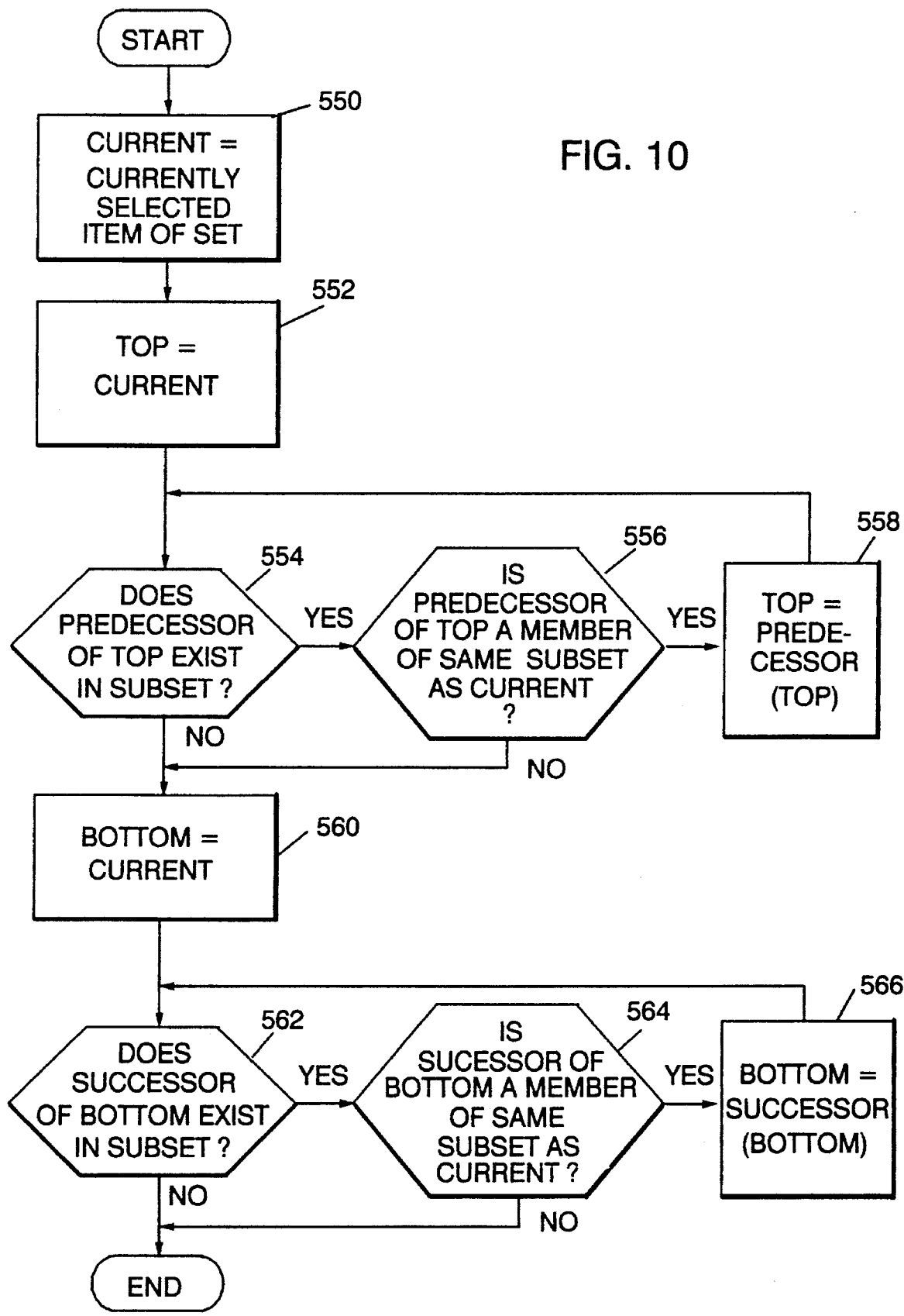
FIG. 10 is a flow chart of a process for determining locations within a subset in accordance with the preferred embodiment of the present invention.

Referring to FIG. 10, a flow chart of a process for determining locations within a subset from step 502 in FIG. 9. This process determines the top of the subset, the bottom of the subset, and the center of the subset. The process begins by setting CURRENT equal to the currently selected item of the set (step 550). CURRENT is the current item for the subset. The process then sets TOP equal to CURRENT (step 552). TOP is the top item in the subset. The process then determines whether the predecessor of TOP exists in the subset (step 554). If the predecessor of TOP exists in the subset, the process then determines whether the predecessor of TOP is a member of the same subset as CURRENT (step 556). If the answer to step 556 is yes, TOP is set equal to PREDECESSOR (TOP), the predecessor of TOP (step 558).

Thereafter, the process returns to step 554. If the answer is no in either step 554 or step 556, the process then sets BOTTOM equal to CURRENT (step 560). BOTTOM is the bottom item in the subset. Thereafter, the process determines whether successor of BOTTOM exists in the subset (step 562). If the successor of BOTTOM does exist in the subset, the process then determines whether the successor of BOTTOM is a member of the same subset as CURRENT (step 564). If the answer is yes, the process sets BOTTOM equal to SUCCESSOR (BOTTOM), successor of BOTTOM (step 566). Thereafter, the process returns to step 562. If the answer in either step 562 or step 564 is no, the process then terminates.

Figure 11A:
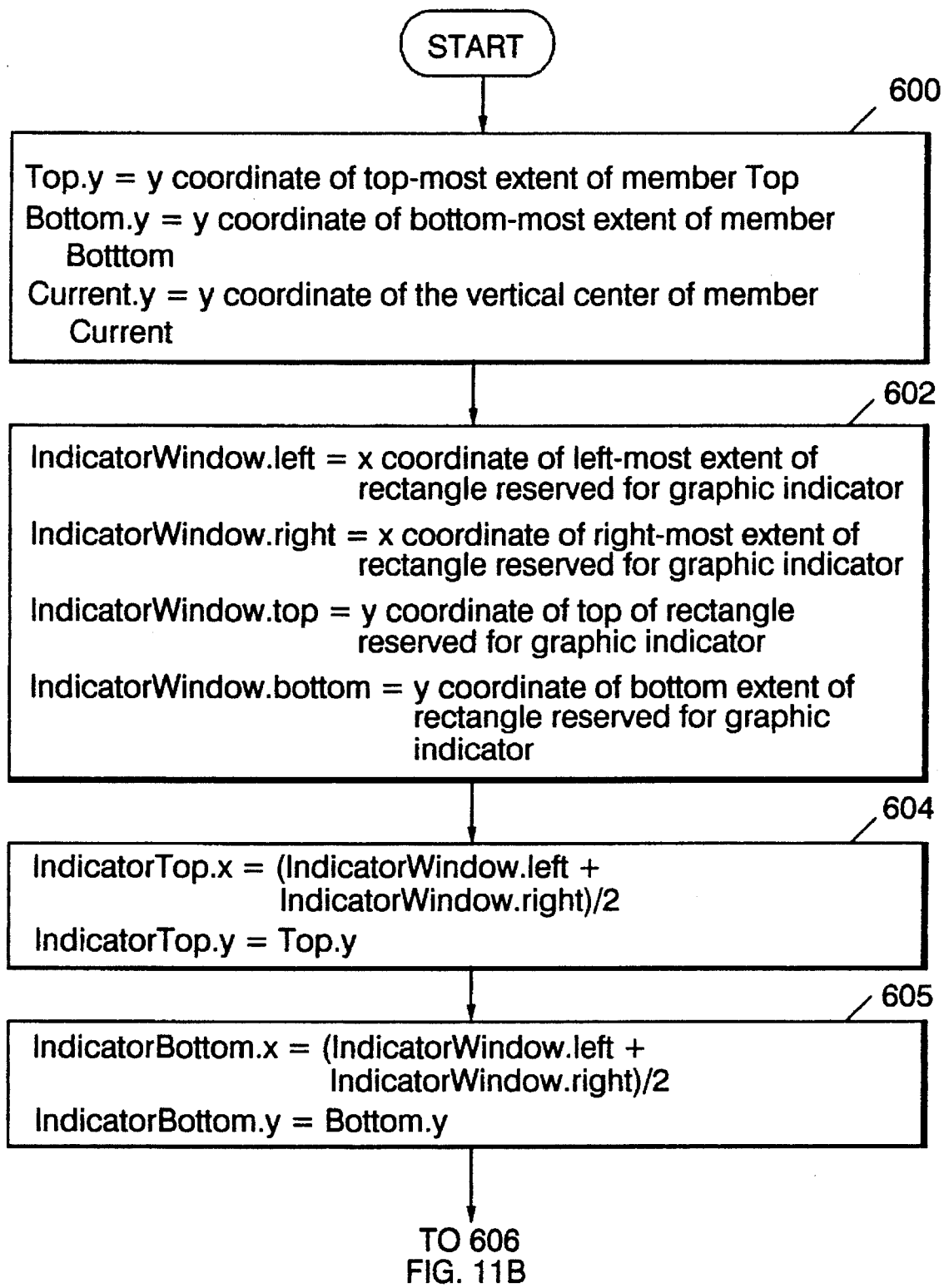
FIG. 11 depicts a process for drawing an indicator in accordance with the preferred embodiment of the present invention.

Referring now to FIG. 11, a process for redrawing the indicator, as depicted in step 504 in FIG. 9 is illustrated in accordance with a preferred embodiment of the present invention. The process begins by setting Top.y equal to the y coordinate of top-most extent of member TOP; Bottom.y equal to the y coordinate of bottom-most extent of member BOTTOM; Current.y equal to the y coordinate of the vertical center of member CURRENT (step 600). Thereafter, the process sets IndicatorWindow.left equal to the coordinate of left-most extent of the rectangle reserved for graphic indicator; IndicatorWindow. right equal to the coordinate of right-most extent of the rectangle reserved for graphic indicator; IndicatorWindow.top equal to the y coordinate of top extent of rectangle reserved for graphic indicator; IndicatorWindow. bottom equal to the y coordinate of the bottom extent of rectangle reserved for graphic indicator (step 602).

Next, the process sets IndicatorTop.x equal to (IndicatorWindow. left+IndicatorWindow. right)/2 and IndicatorTop.y equal to Top.y (step 604). The process then sets IndicatorBottom.x equal to (IndicatorWindow.left+IndicatorWindow. right)/2 and IndicatorBottom y equal to Bottom .y (step 605). Thereafter, the process sets IndicatorLeft.x equal to IndicatorWindow.left and IndicatorRight.x equal to IndicatorWindow. right (step 606). Thereafter, the process determines whether a standard diamond draw is to be performed (step 608). A standard diamond draw involves drawing a diamond shaped polygon that is symmetrical about two axes. A nonstandard diamond draw involves drawing a deformed diamond shaped polygon. If a standard diamond draw is to be performed, the process sets IndicatorLeft.y equal to (Top .y+Bottom.y)/2 and IndicatorRight.y equal to (Top .y+Bottom.y)/2 (step 610). Then, the process draws a closed polygon represented by the points IndicatorTop, IndicatorLeft, IndicatorBottom, IndicatorRight, and IndicatorTop clipped to the indicator window (step 612). Referring again to block 608, if a diamond draw is not to be performed, the process then sets IndicatorLeft.y equal to Current.y and IndicatorRight.y equal to Current.y (step 614). Then, the process draws the polygon as illustrated in block 612.

Although the depicted embodiment shows a diamond and a deformed diamond, a marker employing some other shape may be used in accordance with a preferred embodiment of the present invention.

While the invention has been particularly shown and described with reference to a preferred embodiment, it will be understood by those skilled in the art that various changes in form and detail may be made therein without departing from the spirit and scope of the invention.

I claim:

1. A method in a data processing system, which includes data having a plurality of data subsets, said method comprising:

displaying a display window, wherein said data is displayed within said display window;

selecting a data subset within said plurality of data subsets comprising said data; and displaying a marker in association with said display window in response to selection of a member of said data subset, said marker having two terminuses, an upper terminus and a lower terminus, wherein a location of said upper terminus indicates an upper boundary of said data subset and a location of said lower terminus indicates a lower boundary of said data subset and wherein an absence of one of said two terminuses intuitively indicates, to a user, a presence of additional undisplayed data within said data subset.

2. The method of claim 1, wherein said step of displaying said marker having two terminuses, an upper terminus and a lower terminus wherein said upper terminus indicates an upper boundary of said data subset and said lower terminus indicates a lower boundary of said data subset comprises displaying a polygon having two terminuses in association with said display window, an upper terminus and a lower terminus wherein said upper terminus indicates an upper boundary of said data subset and said lower terminus indicates a lower boundary of said data subset.

3. The method of claim 1, wherein said step of displaying said marker having two terminuses, an upper terminus and a lower terminus wherein said upper terminus indicates an upper boundary of said selected data subset and said lower terminus indicates a lower boundary of said selected data subset comprises displaying a diamond shaped polygon having an upper and a lower point, wherein said upper terminus is said upper point and said lower terminus is said lower point.

4. The method of claim 3, wherein said diamond shaped polygon has a right and a left point and wherein said step of displaying further comprises displaying said right point and said left point half way between said upper point and said lower point.

5. The method of claim 4, wherein said step of displaying a marker further comprises displaying a first side and a second side for said marker, each side having a slope, wherein said slope intuitively indicates, to a user, a distance of an absent terminus from said right point and said left point of said marker.

6. The method of claim 3, wherein said data subset comprises a plurality of entries and further comprising selecting one of said plurality of entries within said data subset.

7. The method of claim 6, wherein said diamond shaped polygon has a right and a left point and wherein said step of displaying further comprises displaying said right point and said left point along a line intersecting said selected entry.

8. A data processing system, which includes data having a plurality of data subsets, said data processing system comprising:

first display means for displaying a display window, wherein said data is displayed within said display window;

selection means for selecting a data subset within said plurality of data subsets comprising said data; and second display means for displaying a marker in association with said display window in response to selection of said data subset, said marker having two terminuses, an upper terminus and a lower terminus, wherein a location of said upper terminus indicates an upper boundary of said data subset and a location of said lower terminus indicates a lower boundary of said data subset and wherein an absence of one of said two terminuses intuitively indicates, to a user, a presence of additional undisplayed data within said data subset.

9. The data processing system of claim 8, wherein said second display means comprises means for displaying a polygon having two terminuses in association with said display window, an upper terminus and a lower terminus wherein said upper terminus indicates an upper boundary of said data subset and said lower terminus indicates a lower boundary of said data subset.

10. The data processing system of claim 8, wherein said second display means comprises means for displaying a diamond shaped polygon having an upper and a lower point, wherein said upper terminus is said upper point and said lower terminus is said lower point.

11. The data processing system of claim 10, wherein said data subset comprises a plurality of entries and further comprising selection means for selecting one of said plurality of entries within said data subset.

12. The data processing system of claim 11, wherein said diamond shaped polygon has a right and a left point and wherein said second display means further comprises displaying said right and left points along a line intersecting said selected entry.

13. The data processing system of claim 12, wherein said diamond shaped polygon has a right side and a left side, each side having a slope, wherein said slope intuitively indicates, to a user, a distance of an absent terminus from said right point and said left point at said marker.

14. The data processing system of claim 10, wherein said diamond shaped polygon has a right and a left point and wherein said second display means further comprises means for displaying said right and left points half way between said upper point and said lower point.

15. Computer code stored in a storage device readable by a data processing system comprising:

first subprocesses for displaying a display window, wherein said data is displayed within said display window;

second subprocesses for selecting a data subset within the said plurality of data subsets comprising said data; and third subprocesses for displaying a marker in association with said display window in response to selection of said data subset, said marker having two terminuses, an upper terminus and a lower terminus, wherein a location of said upper terminus indicates an upper boundary of said data subset and a location of said lower terminus indicates a lower boundary of said data subset and wherein an absence of one of said two terminuses intuitively indicates, to a user, a presence of additional undisplayed data within said data subset, wherein said subprocesses are activated when said storage device is connected to and accessed by said data processing system.

16. The computer code of claim 15, wherein said storage device is a hard disk drive.

17. The computer code of claim 15, wherein said storage device is a ROM for use with a data processing system.

18. The computer code of claim 15, wherein said storage device is a floppy diskette.

* * * * *